US008061601B1

(12) United States Patent
Harkins et al.

(10) Patent No.: US 8,061,601 B1
(45) Date of Patent: Nov. 22, 2011

(54) METHODS AND APPARATUS FOR ESTABLISHING AND MAINTAINING ELECTRONIC SHELF LABEL INFORMATION

(75) Inventors: Cheryl Kay Harkins, Lawrenceville, GA (US); Albert M. G. Claessen, Oakwood, GA (US)

(73) Assignee: NCR Corporation, Duluth, GA (US)

( * ) Notice: Subject to any disclaimer, the term of this patent is extended or adjusted under 35 U.S.C. 154(b) by 1490 days.

(21) Appl. No.: 11/462,857

(22) Filed: Aug. 7, 2006

(51) Int. Cl.
*G06K 15/00* (2006.01)
(52) U.S. Cl. ........................................ 235/383; 235/380
(58) Field of Classification Search .................. 235/383, 235/380, 375, 385
See application file for complete search history.

(56) References Cited

U.S. PATENT DOCUMENTS

2003/0222139 A1* 12/2003 Stephenson et al. .......... 235/383
* cited by examiner

*Primary Examiner* — Karl D. Frech
(74) *Attorney, Agent, or Firm* — Peter Priest

(57) ABSTRACT

Systems and techniques for linking electronic shelf labels to and unlinking electronic shelf labels from a system. When a printed overlay for an electronic shelf label is prepared, a radiofrequency identification (RFID) tag is affixed as part of the overlay. The RFID tag provides an identifier associated with a product. When an ESL to which the overlay is affixed is to be linked, the RFID tag is read at substantially the same time the ESL is interrogated, and the product associated with the RFID tag identifier is associated with the ESL. When an ESL is to be unlinked, a communication including an identifier for the ESL is provided to a central data processor, with the communication having characteristics indicating that the ESL is to be unlinked. When a communication is received from an ESL, the characteristics of the communication are evaluated to determine if the ESL is designated for unlinking.

24 Claims, 4 Drawing Sheets

METHODS AND APPARATUS FOR ESTABLISHING AND MAINTAINING ELECTRONIC SHELF LABEL INFORMATION

FIELD OF THE INVENTION

The present invention relates generally to improvements to electronic shelf labels (ESLs) for display of pricing and other desired information for goods. More particularly, the invention relates to improved systems and techniques for linking and unlinking ESLs.

BACKGROUND OF THE INVENTION

ESLs provide a convenient way to display prices and other relevant information about goods. A retail location may have hundreds or thousands of ESLs that receive pricing and other information transmitted by a communication base station. The communication base station provides an interface between a central server and the ESLs.

In order to for ESLs in a system to display correct and current information, proper records of which ESLs are in the system must be kept and updated as ELSs are added to or removed from the system. An ESL system typically includes an ESL database storing identification information for each ESL operating in the system. For each ESL, an association is maintained between the ESL and the product for which the ESL is displaying information. The database also maintains information to be displayed by the ESL. As product information changes, updated information is transmitted to the ESL, for example, periodically at predetermined times.

Each ESL operating in a system typically has affixed a printed overlay, providing visible information for customers and retailer employees in order to identify the product for which the ESL is providing information. Each ESL must maintain the pricing information for the product indicated on the printed overlay affixed to the ESL, in order to avoid mispricing of a product. This means that an association should be maintained in the ESL database between an identifier of each ESL, such as an ESL serial number, and an identifier of the overlay affixed to the ESL, for example, an overlay identification number. Entering such information in ways which require direct attention to each ESL is typically a tedious process involving relatively high labor costs, because thousands of ESLs may be involved.

In addition to properly storing information for each ESL, conveniently referred to as linking an ESL, it is also important to remove the identifier of an ESL from the database when necessary, or to otherwise indicate that the ESL need not be updated. ESLs are frequently physically removed from an ESL system. When an ESL is removed, it is important to indicate that the ESL no longer needs to be updated, in order to avoid continued attempts to communicate with the ESL. Such continued attempts to communicate with ESLs that are no longer present can overburden a system and slow response if a large number of ESLs have been removed from the system but have not been unlinked.

SUMMARY OF THE INVENTION

Among its several aspects, the invention recognizes a need for systems and techniques for convenient and accurate linking and unlinking of ESLs. When an overlay is printed, a radiofrequency identification (RFID) tag is included in the overlay. The RFID tag may suitably include product information as printed on the overlay, or may alternatively simply include an identifier, with the identifier being associated with appropriate product information in the ESL database. The identifier may also be associated with information relating to the overlay, such as formatting and content information for the overlay. Whether product information is stored on the tag itself or stored in a database associated with an identifier, the tag information and product information are stored in the ESL database, along with any overlay information that has been associated with the tag information. The overlay is affixed to any available ESL that is not yet linked, such as one of a supply of ESLs awaiting programming and installation. When an ESL is to be linked, an RFID reader is used to read the RFID tag and the serial number of the ESL. The RFID tag identifier and the product information associated with the RFID tag are associated with the ESL serial number in the ESL database.

ESLs that are to be unlinked may be identified in various ways. For example, such ESLs may be placed in a dedicated area, such as a special receptacle. The receptacle may be located within range of a communication base station (CBS) which is within range only of the receptacle and out of range of ESLs that are continuing to be used in the system. Alternatively, identification information, such as a barcoded serial number, may be entered, for example, by using a scanner placed on or near a receptacle in which ELS that are to be unlinked are placed. Still another alternative is to set a special flag in the memory of an ESL that is to be unlinked. The setting of the flag may be accomplished, for example, by the use of a portable reader carried by a retailer employee who removes the ESL from a shelf. At the same time the flag is set, a command may also be issued to the ESL to clear the display of the ESL.

ESLs in which the special flag has been set may be placed in any suitable location that experiences good communication coverage. At a periodic interrogation of ELSs in the location, each ESL is checked for the presence of the special flag. Each ESL for which the special flag is detected to have been set is removed from the database. Alternatively, a database entry for the ESL is updated to reflect an inactive status for the ESL. In addition, a command may be sent to the ESL to display an appropriate message, such as "UNLINKED".

A more complete understanding of the present invention, as well as further features and advantages of the invention, will be apparent from the following Detailed Description and the accompanying drawings.

DETAILED DESCRIPTION

Figure 1A:
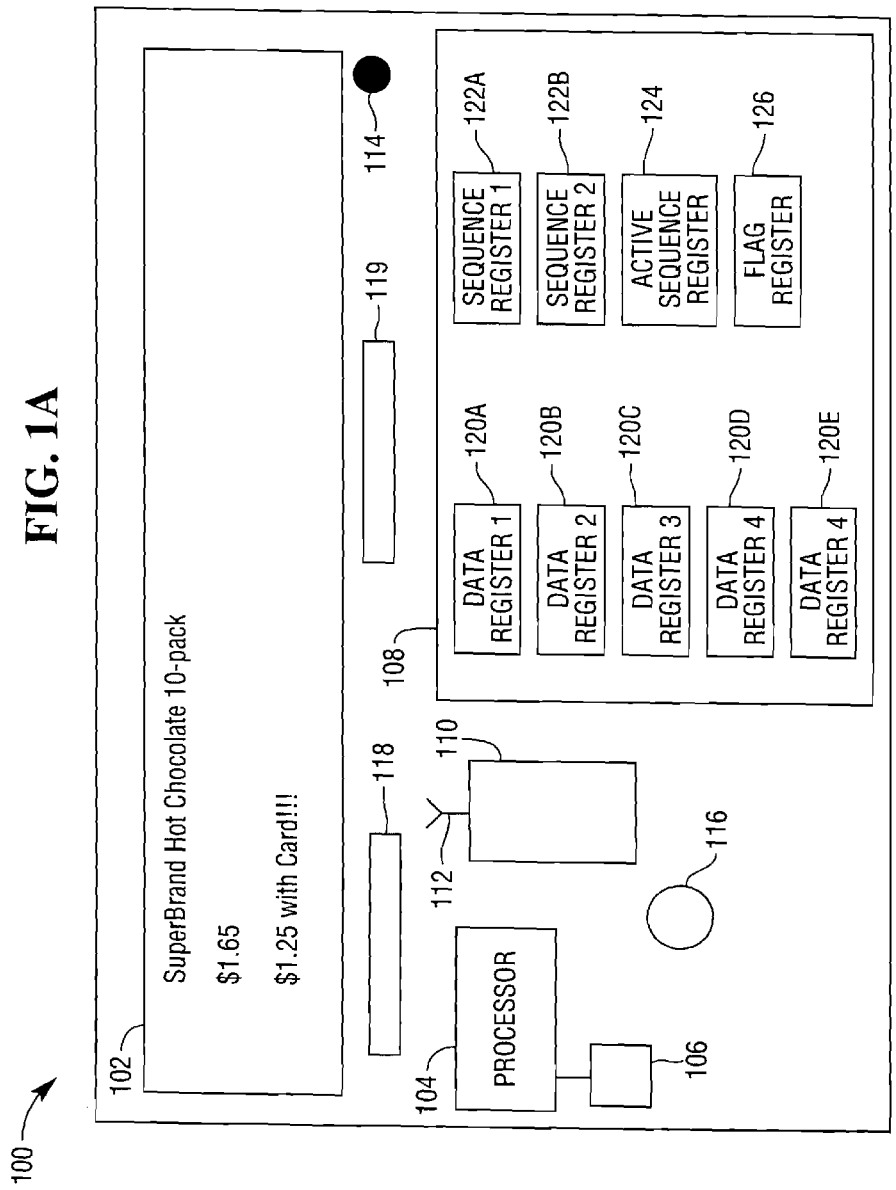
FIG. 1A illustrates an electronic shelf label according to an aspect of the present invention.

FIG. 1A illustrates an electronic shelf label (ESL) 100 according to an aspect of the present invention. The ESL 100 includes a display screen 102, a processor 104, a clock 106, a memory 108, a communication interface 110 and an antenna 112. The ESL 100 may include a pushbutton 114 for selecting display options, paging through successive display screens or otherwise accepting and acting on user inputs. The ESL 100 may include an internal power source such as a battery 116, or may alternatively receive power from an external source. The ESL also includes a permanent or semipermanent memory register 118, storing a serial number for the ESL. The ESL may also include a serial number RFID tag 119, storing the serial number or other identifier for the ESL.

The memory 108 may suitably be organized to include a plurality of registers, with registers falling into one of several different categories. Some categories of registers store information for display and use, and other categories of registers store information and commands used to control the operation of the ESL 100.

One category of registers may conveniently be referred to as data registers. Data registers are used to store various elements of information for display and use. The register 120A stores price information and the registers 120B and 120C store additional product description information that can be selected for display. Most notably for the present discussion, the register 120D stores an unlinked indicator display. In the present case, the register 120D stores the text message "UNLINKED", preceded and followed by rows of asterisks. An additional register is the register 120E, which is typically held empty. Selection of a particular register for display may be performed according to stored control data in control registers such as the registers 122A and 122B. An active sequence register 124 may store information controlling selection of the control register that is to be active at any particular time. Depending on choices made for operation of a system in which the ESL 100 may be used, the display registers 120A-120E may simply be programmed with information to be displayed, or commands may be sent to the ESL 100 selecting a particular display register for display. Such commands may program one or more of the control registers 122A and 122B, or may program the active sequence register 124 to direct selection of a control register that is to be active and therefore to control the sequence in which information from the display registers 120A-120E is to be displayed. The above discussion is exemplary, and it will be recognized that other mechanisms may be chosen for display of information by the ESL 100 as desired.

The memory 108 also suitably includes a flag register 126, which is set to a "normal" state before linking, during normal operation, and after unlinking. The flag register 126 is set to an "unlink" state when the ESL 100 is scheduled for unlinking.

Figure 1B:
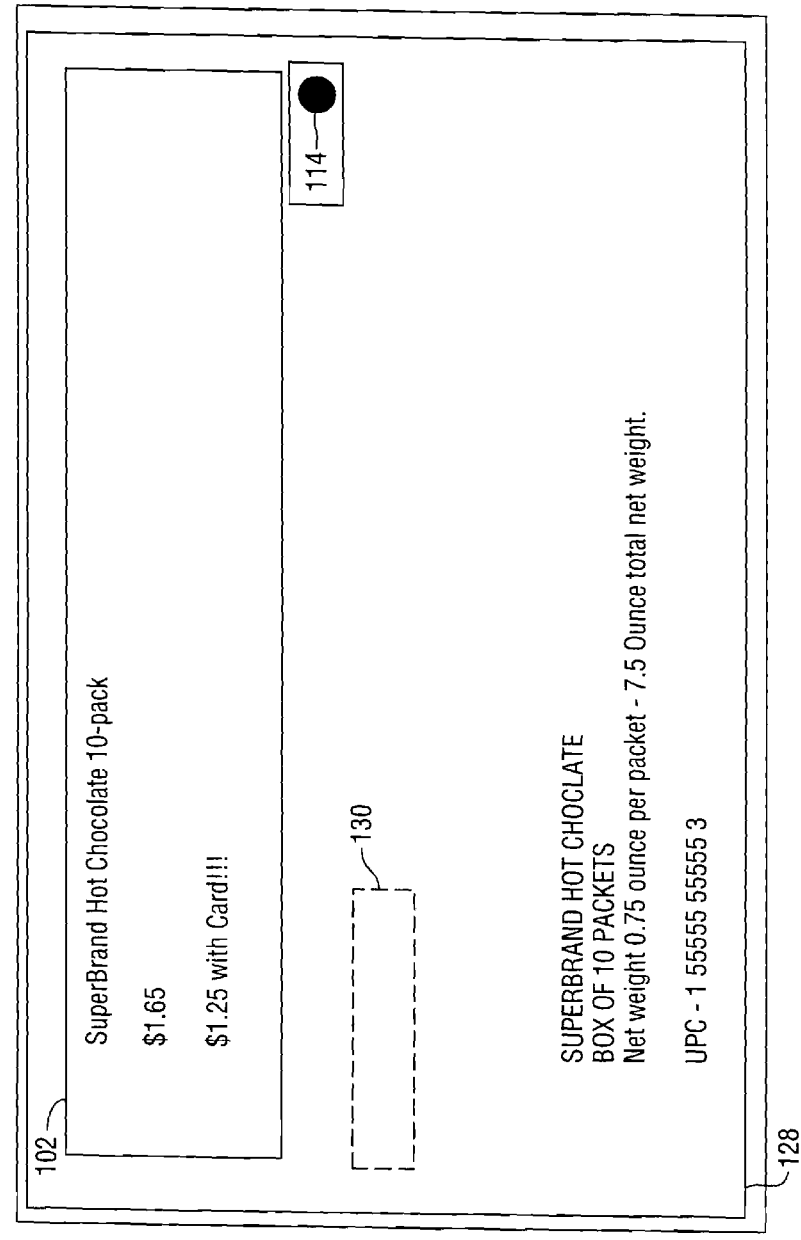
FIG. 1B illustrates an electronic shelf label including an overlay according to an aspect of the present invention.

FIG. 1B illustrates the ESL 100, with a printed overlay 128 affixed to the ESL 100. The display 102 and the pushbutton 114 are visible. The printed overlay 128 includes a printed description of a product with which the ESL 100 is to be associated. The overlay 128 includes an RFID tag 130, suitably affixed to the overlay 128. At the time the overlay is printed, appropriate information is stored in the tag 130 or associated with a tag identifier. In one alternative, product information may be stored in the tag 130 itself. In another alternative, product information may be associated with an identifier characterizing the tag 130. Suitably, overlay information, such as formatting and content information for the overlay 128, may also be stored in the tag 130 or associated with a tag identifier.

Depending on the design and use of the tag 130, a tag identifier may suitably be stored in the tag at the time the overlay is printed or alternatively may be present in the tag before the overlay is printed. An RFID reader can simultaneously read the RFID tag 130 and the ESL serial number encoded on the tag 119. Because the RFID tag 130 includes information associated with the product, sufficient information is available to a device, such as an RFID reader, to enable identification information for the ESL 100 to be associated with the correct product, without undue intervention by a retailer employee. Instead of needing to perform scans of overlay and tag identifiers, an employee need simply bring a reader within the vicinity of an ESL, or bring the ESL within the vicinity of a reader. As will be discussed below in greater detail, the reader retrieves needed information and transfers the information to a central server, which properly links the ESL 100 in an ESL database, in association with correct product information.

As an alternative to reading an RFID tag affixed to an ESL, such as the tag 119 affixed to the ESL 100, a reader may simply interrogate the ESL directly. For example, the ESL 100 may be interrogated with a request to furnish its serial number, which can then be received by the reader and used to associate the overlay 128 with the tag 100. However, if the serial number of an ESL is not known, a message transmitted to the ESL is typically broadcast to all ESLs within range, and each ESL receiving the interrogation with will respond with its own serial number. Therefore, if an ESL such as the ESL 100 is to be interrogated directly, it will produce more reliable results for the interrogation area to be isolated or shielded from other ESLs so that unintended responses are not received.

Figure 2:
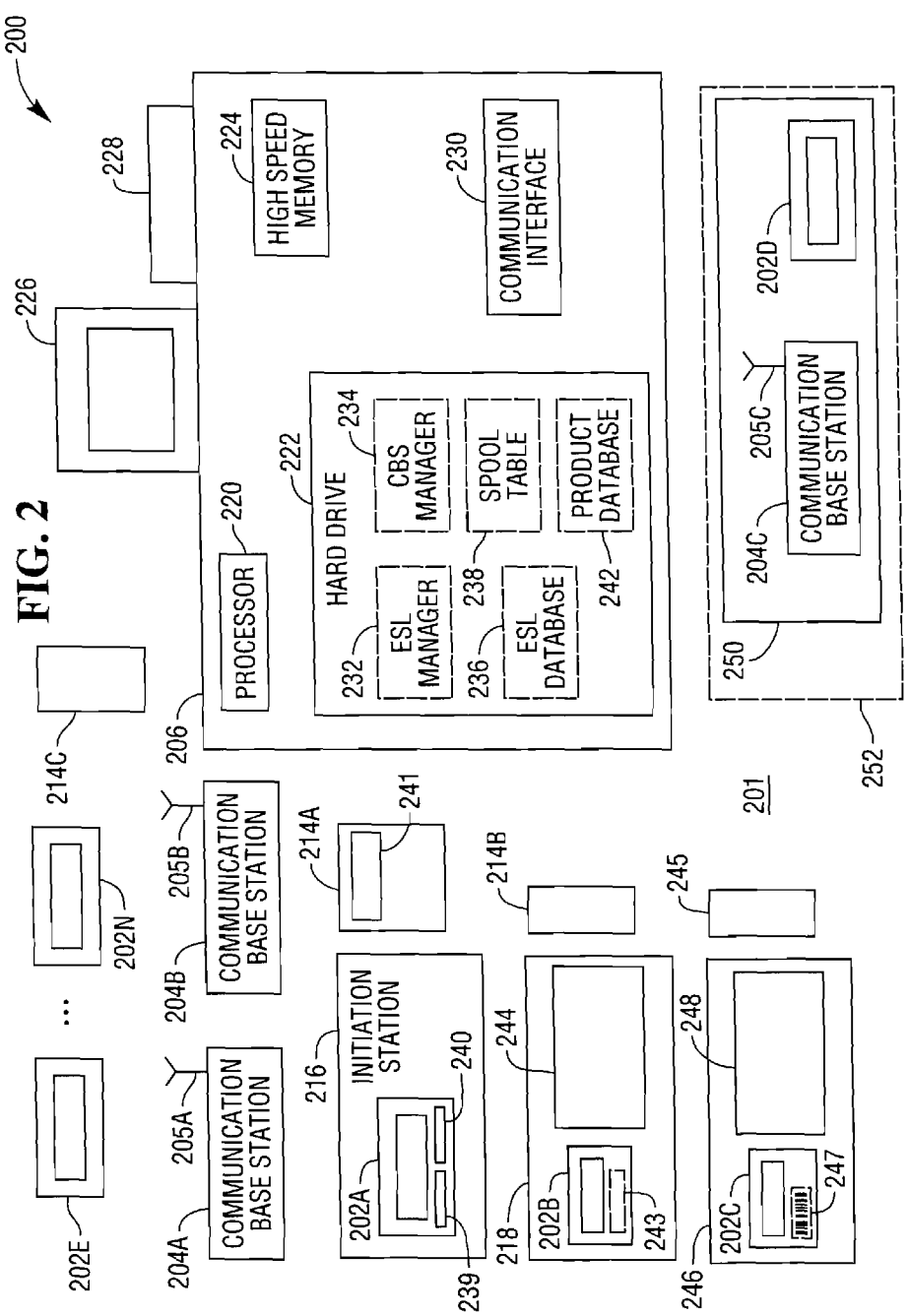
FIG. 2 illustrates an electronic shelf label system according to an aspect of the present invention.

FIG. 2 illustrates an ESL system 200, including a plurality of ESLs 202A, . . . , 202N, with special attention being paid to the ESLs 202A-202D. The ESLs 202A, . . . , 202N may suitably be similar in design and programming to the ESL 100. The system 200 also includes a plurality of communication base stations (CBSs) 204A-204C for transmitting data and commands to and receiving information and responses from the ESLs 202A, . . . , 202N. The CBSs employ antennas 205A, 205B, and 205C, respectively. The system 200 also includes a server 206 for managing operation of the communication base stations 204A-204C. The system 200 further includes fixed ESL communication devices 214A and 214B, as well as a portable ESL communication device 214C that can be moved about the facility 201 in which the system 200 is deployed. The devices 214A-214C may be used as needed to collect information to be used in linking and unlinking ESLs, but as depicted here, the device 214A will be placed at an initiation station 216 and ESLs that are to be placed into service will be read using the device 214A. The device 214B will be fixed at an unlinking station 218 where ESLs are to be placed for unlinking. The device 214C will moved about the facility 201 as needed in order to communicate with ESLs that are to be unlinked. Each of the devices 214A-214C may communicate with any CBS within range, or directly with the server 206.

The server 206 preferably includes a processor 220, permanent storage such as a hard drive 222, high speed memory 224, display 226 and keyboard 228. The server 206 also includes a communication interface 230 for controlling the communication base stations 204A-204C and the devices 214A-214C.

The server 206 suitably operates under the control of an ESL manager 232 and a communication base station manager 234. The ESL manager 232 uses and maintains an ESL database 236, which stores data identifying each ESL used in the system 200. The database 236 also data being displayed by the ESL, as well as any updated data scheduled for transmission to the ESL. The ESL database 236 stores the serial number of each ESL, and may suitably store information such as status and stored data images for each ESL. The data images may include images of the data presently stored in the ESL, as well as images of data to be transmitted to the ESL. The ESL database 236 suitably stores product identification information for the product associated with each ESL, and may suitably store status information for each ESL, for example, whether the ESL is linked or unlinked.

The ESL manager 232 prepares messages for transmission to the ESLs, and also monitors and maintains an action list for the ESLs using spool tables such as the table 238. A spool table is a list or sequence of actions to be performed as processor resources come available to perform the actions. Actions to be taken may include updating an ESL's information, requesting status updates and other actions required for the operation of the system 200. In order to communicate with one of the ESLs 202A, . . . , 202N, the ESL manager 232 prepares a message and requests transmission by the CBS manager 234, which formats a communication for transmission to the ESL and directs the communication to one or more of the CBSs 204A-204C. The ESL manager 232 also responds to communications received from the CBSs 204A-204C from the various ESLs and RFID devices.

An ESL is linked to the system 200 when appropriate information relating to the ESL is stored in the database 236. This information suitably includes an identifier for the ESL, such as a serial number, as well as product information for the product associated with the ESL. Such information allows the ESL manager 232 to transmit appropriate commands and display information to the ESL.

The ESL 202A is an ESL that has not yet been linked to the system 200. In order to link the ESL 202A to the system 200, a user brings the ESL 202A within the vicinity of an ESL communication device, or brings an ESL communication device to the ESL 202A. In the present example, the ESL 202A is placed at the initiation station 216 and the device 214A determines an identifier for the ESL 202A. In one alternative, the device 214A reads the serial number from the ESL 202A directly. In another alternative, the device 214A reads an RFID tag 239, which stores an identifier for the ESL. Suitably, the identifier stored by the tag 239 is the same as the ESL serial number or can be correlated with the ESL serial number.

The device 214A also reads an RFID tag 240, affixed to the ESL 202A as part of an overlay. The device 214A conveys the ESL identifier, for example, the ESL serial number, and the RFID tag information, to the server 206 through suitable means, such as using a link communication interface 241 to transmit information to a communication base station, or communicating through some other means with the server 206. Upon receipt of the information by the server 206, the ESL manager 232 retrieves appropriate product information from a product database 242 and creates an entry for the ESL 202A in the database 236. The entry includes the ESL identifier and appropriate product information. The product information may simply include a product identifier, or may include more comprehensive product information, such as product description and pricing information. If the product information in the entry for the ESL 202A includes only a product identifier, the ESL manager 232 retrieves product information from the product database when the ESL 202A is to be updated. If the product information in the entry for the ESL 202A includes more comprehensive product information, the ESL manager 232 updates the entry periodically or before updating the ESL 202A.

The ESL 202B is located at the unlinking station 216B. The device 214B is used to communicate with ESLs that are to be unlinked. In the case of the ESL 202B, the reader 214B conveys a command to the ESL 202B to set a flag register 243 to an "unlink" status directing unlinking of the ESL. The register 243 may suitably be similar to the flag register 125 of the ESL 100. At the same time, the display of the ESL 202B is suitably cleared, for example, by clearing display registers or by setting an empty register as the register for display. The ESL 202B is then suitably placed in a receptacle 244, or any other suitable area within range of one or more of the CBSs 204A-204C.

Periodically, the ESL manager 232 directs interrogation of all the ESLs in the facility 201, for example, as part of a routine daily maintenance operation in which price and other information displayed by the ESLs are updated as needed, and the operation status of the ELSs is checked. Each of the CBSs 204A-204C may suitably broadcast queries to all ESLs, receiving responses from all ESLs within range and transferring any information received to the server 206.

When the server 206 receives information from the CBSs 204A-204C, the ESL manager 232 examines the information to determine the status of the ESLs. ESLs in which the flag register is set, such as the ESL 202B, are identified. The ESL manager 232 directs the sending of a command to each such ESL to display an appropriate message, such as the text message "UNLINKED". Each such ESL is also removed from, or set to a status of "unlinked" in, the database 236.

In addition to setting the status of ESLs using an RFID reader, it is possible to use other means to identify ESLs that are to be unlinked. For example, the ESL 202C may be identified for unlinking through the use of a bar code scanner 245, located at the unlinking station 246. Each of the ESLs 202A, . . . , 202N may bear an identifier, such as a barcoded serial number. An example of such a barcoded serial number is the barcoded serial number 246, located on the ESL 202C. When the ESL 202C is to be unlinked, the serial number 246 is scanned using the bar code scanner 245. The ESL 202C is then placed in a receptacle 248. The scanner 245 transmits an identification message to the server 206, identifying the ESL 202C and indicating that the ESL 202C, has been selected for unlinking. The identification message is transferred to the ESL manager 232 for processing. The ESL manager 232 updates the database 236 to remove an entry for the ESL 202C from the database 236, or alternatively to update the entry for the ESL 202C to indicate that the ESL 202C has been unlinked. In addition, the ESL manager 232 may direct transmission of an appropriate command to the ESL 202C, for example, a command to display the message "UNLINKED."

As a further alternative, the ESL 202D is shown as being placed into a receptacle 250 near the CBS 204C. In the present exemplary embodiment, the CBS 204C and the antenna 205C are deployed inside the receptacle 250, so as to isolate the CBS 204C from ESLs that are not placed in the receptacle 250. The antenna 205C may suitably be specially designed so as to limit the communication range of the CBS 204C, or the CBS 204C may operate at a reduced power as compared to the power used for other CBSs in the system 200.

Alternatively, the receptacle 250 may be built so as to shield the CBS 204C and ESLs placed in the receptacle 250, or shielding 252 may be placed around an area containing the CBS 204C and the receptacle 250, so that the CBS 204C is blocked from communicating with ESLs outside of the shielding. As a further alternative, the receptacle 250 may simply be placed at a distance significantly removed from the other CBSs in the system, so that ESLs placed within the receptacle 250 will be out of range of other CBSs.

The CBS 204C periodically queries ESLs within range, for example, the ESL 202D, and passes the responses it receives to the server 206. The ESL manager 232 evaluates the responses, and identifies ESLs responding to the query from the CBS 204C as selected for unlinking. The ESL manager updates the ESL database 236 to unlink ESLs from which the CBS 204C received a response, either by removing the entries for the ESLs or by updating the entries to indicate that the ESLs have been unlinked. The ESL manager 232 may then transmit a command to the CBS 204A for communication to ESLs such as the ESL 202D, for example, a command to display the message "UNLINKED."

While a receptacle 250 is illustrated here, it will be recognized that ESLs may simply be placed in a designated area, isolated from CBSs other than one or more CBSs designated to communicate with ESLs placed in that area to be unlinked.

Figure 3:
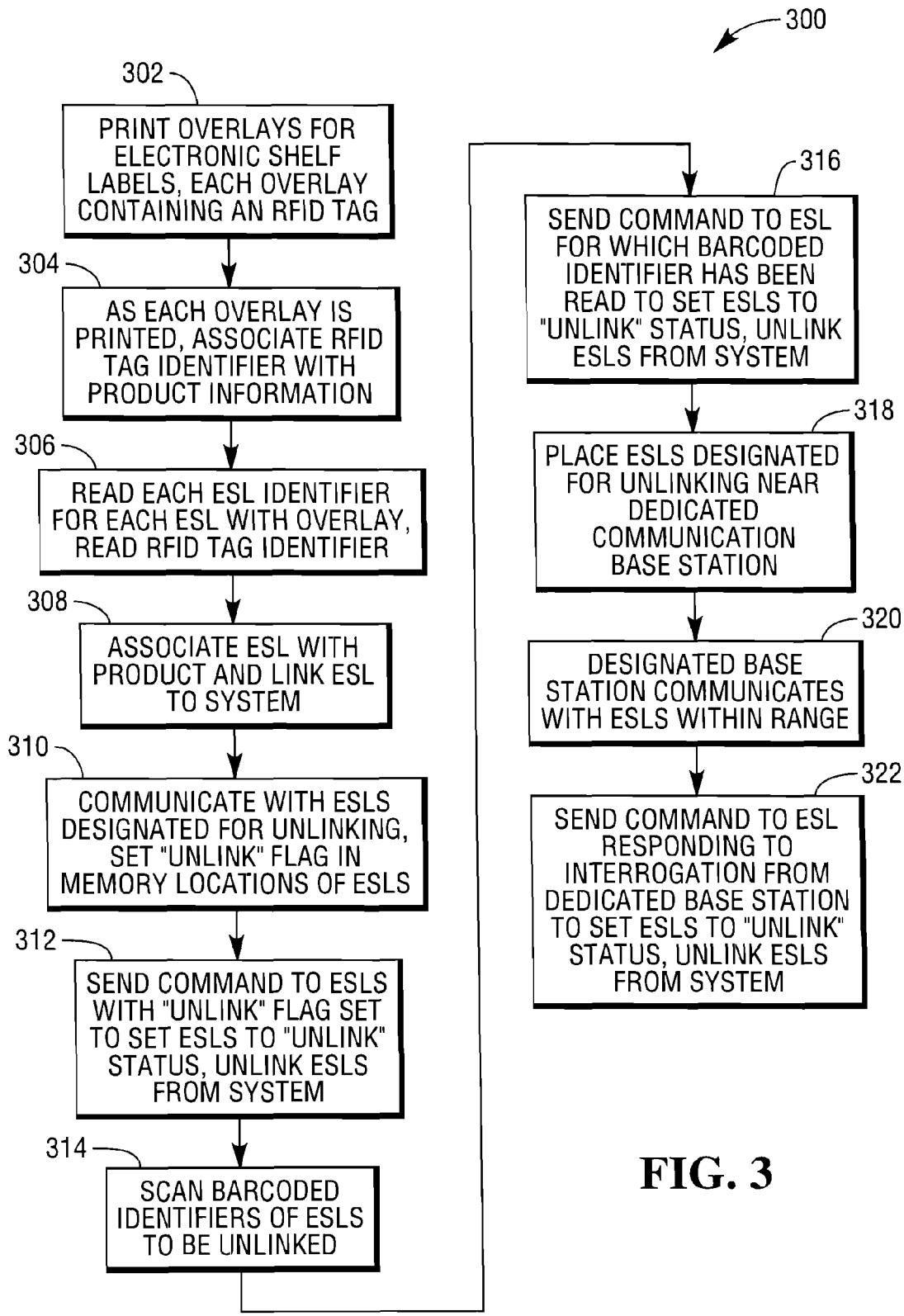
FIG. 3 illustrates a process of linking and unlinking electronic shelf labels according to an aspect of the present invention.

FIG. 3 illustrates a process 300 of linking and unlinking electronic shelf labels according to an aspect of the present invention. The process 300 may suitably be carried out using a system similar to the system 200 of FIG. 2, with electronic shelf labels similar to the label 100 of FIG. 1.

At step 302, a plurality of overlays are printed for electronic shelf labels. Each overlay includes an RFID tag responding with identification information upon interrogation of the tag. At step 304, as each overlay is printed, the identifier of the RFD tag is associated with product information for the product described by the overlay. The RFID tag may also optionally be encoded with actual product information for the product.

At step 306, an identifier for each one of a plurality of ESLs with affixed overlays is read, along with the RFID tag. The identifier for each ESL may be read directly from the ESL, or may be read through some other means, such as through an RFID tag affixed to the ESL.

At step 308, identification information for the RFID tag and the ESL is associated with a product for which identification information is provided by the RFID tag and an entry is created and stored in an ESL database in order to link the tag to an ESL system.

The following steps relate to several different techniques for unlinking ESLs. Each technique involves receiving a communication providing an identifier of an ESL, evaluating characteristics of the communication, and unlinking the ESL if the evaluation of the characteristics indicates that the ESL has been designated for unlinking. Each technique may be used for selected tags within the system or only one of the techniques may be used for a particular system, as desired.

At step 310, when an ESL is to be unlinked, a communication device communicates with the ESL and directs setting of an "unlink" flag in a suitable memory location of the ESL. At step 312, upon detection of the flag in an interrogation of the ESL, a command is sent to the ESL to set the ESL to an "unlink" status and an ESL database is updated so as to accomplish unlinking of the ESL.

As an alternative or additional technique, at step 314, when an ESL is to be unlinked, a barcoded identifier on the ESL is scanned and the identifier is conveyed to a server maintaining an ESL database. At step 316, a command is sent to the ESL indicated by the identifier to set the ESL to an "unlink" status and an ESL database is updated so as to accomplish unlinking of the ESL.

As an additional or alternative technique, at step 318, one or more ESLs selected for unlinking are placed in the vicinity of a communication base station dedicated to communicating with ESLs selected for unlinking. At step 320, the base station communicates with ESLs within range. At step 322, a command is sent to each ESL responding to the designated base station to set the ESL to an unlinked status, and the ESL database is updated so as to accomplish unlinking of each ESL from which identification information was received from the dedicated communication base station.

While the present invention is disclosed in the context of a presently preferred embodiment, it will be recognized that a wide variety of implementations may be employed by persons of ordinary skill in the art consistent with the above discussion and the claims which follow below.

We claim:

1. An overlay for an electronic shelf label (ESL), comprising:
    a surface on which information is printed relating to a product to be associated with an electronic shelf label to which the overlay may be affixed; and
    a radiofrequency identification (RFID) tag affixed to the overlay including information identifying the product to be associated with the electronic shelf label.

2. The overlay of claim 1, wherein the RFID tag includes a tag identifier having an association with the product, the identifier providing an index to a database from which descriptive information for the product may be retrieved.

3. The overlay of claim 2, wherein the association is created at the time the overlay is printed.

4. The overlay of claim 1, wherein the RFID tag includes descriptive information relating to the product.

5. An electronic shelf label communication device, comprising:
    a receiver operative to read ESL identification information identifying an ESL;
    a reader operative to read RFID tag information from an RFID tag within an overlay affixed to the ESL; and
    a communication interface operative to transfer the ESL information and the RFID tag information to a data processing center to allow association of the ESL with a product identified by the RFID tag information.

6. A data processing center for maintaining and updating data relating to ESLs linked and unlinked in an electronic shelf label system, comprising:
    a communication interface for receiving communications from one or more devices conveying information relating to ESLs identified for linking and unlinking;
    an ESL database storing identifiers and link and unlink status for ESLs linked in the system; and
    a communication interface operative to receive ESL identification information for ESLs to be linked and unlinked; and
    a processor for processing identification information received from the communication interface, the processor being operative to analyze characteristics of the identification information for indications that an identified ESL is to be linked or unlinked and to perform linking or unlinking as indicated by the analysis.

7. The data processing center of claim 6, wherein the identification information includes an ESL identifier, and an identifier for an RFID tag within an overlay affixed to the ESL and wherein the processor is operative to use the identifier for the RFID tag to retrieve product information associated with the RFID tag and to store an association between the ESL and the product information in the ESL database.

8. The data processing center of claim 7, wherein at the time the overlay is printed, the processor is operative to receive the RFID tag identifier and product information relating to the product information printed on the overlay and to store an association between the RFID tag and the product information.

9. The data processing center of claim 6, wherein the ESL identification information includes an ESL identifier, and the characteristics of the identification information include an indication that the ESL identifier was received by scanning a bar code.

10. The data processing center of claim 6, wherein the ESL identification information includes an ESL identifier, and the characteristics of the identification information include an indication that the ESL identifier was received by a transmission conveyed through a specified communication base station.

11. The data processing center of claim 10, wherein the specified communication base station is a base station deployed so as to communicate with ESLs that are placed in an area dedicated to ESLs that are intended to be unlinked, the specified communication base station being isolated from communicating with ESLS that are not placed in the area dedicated to ESLs that are intended to be unlinked.

12. The data processing center of claim 11, wherein the specified communication base station is a communication base station deployed so as to communicate with ESLs placed in a receptacle, the specified communication base station being isolated from communicating with ESLs outside of the receptacle.

13. The data processing center of claim 12, wherein an antenna of the specified communication base station is deployed inside the receptacle so as to allow the specified communication base station to communicate with ESLs inside the receptacle and isolate the specified communication base station from communicating with ESLs outside of the receptacle.

14. The data processing center of claim 6, wherein the ESL identification information is associated with an indication that an "unlink" flag has been set.

15. A method of linking an electronic shelf label (ESL) comprising the steps of:
   reading an ESL identifier;
   reading an RFID tag affixed to the ESL; and
   storing an identifier for the ESL in association with product information associated with the RFID tag.

16. A method of unlinking an electronic shelf label (ESL), comprising the steps of:
   receiving from a communication including an ESL identifier;
   evaluating characteristics of the communication providing the identifier; and
   unlinking the ESL if the evaluation of the characteristics of the communication indicates that the tag is designated for unlinking.

17. The method of claim 16, wherein the step of evaluating characteristics of the communication includes evaluating information relating to the condition of the ESL included in the communication.

18. The method of claim 17, wherein the step of evaluating characteristics of the communication includes evaluating information identifying the condition of an "unlink" flag as set or not set.

19. The method of claim 16, wherein the step of evaluating characteristics of the communication includes identifying a source of information included in the communication.

20. The method of claim 19, wherein the step of evaluating characteristics of the communication includes identifying the communication as including information originating from scanning of a bar code.

21. The method of claim 19, wherein the step of evaluating characteristics of the communication includes identifying a communication base station through which the communication is routed.

22. The method of claim 21, wherein identifying a communication base station through which the communication is routed includes identifying the communication base station through which the communication is routed includes identifying the communication base station as a communication base station deployed so as to communicate with ESLs that are placed in an area dedicated to ESLs that are intended to be unlinked, the communication base station being isolated from communicating with ESLS that are not placed in the area dedicated to ESLs that are intended to be unlinked.

23. The method of claim 22, wherein the ESLs are placed in a receptacle and the communication base station is deployed so as to communicate with ESLs inside the receptacle and isolated from communicating with ESLs outside the receptacle.

24. The method of claim 23, wherein an antenna of the communication base station is placed inside the receptacle so as to allow the communication base station to communicate with ESLs inside the receptacle and isolate the communication base station from communicating with ESLs outside of the receptacle.

* * * * *